March 25, 1952 H. H. GATES 2,590,170
PORTABLE AIR GAUGE
Filed June 14, 1947 2 SHEETS—SHEET 1
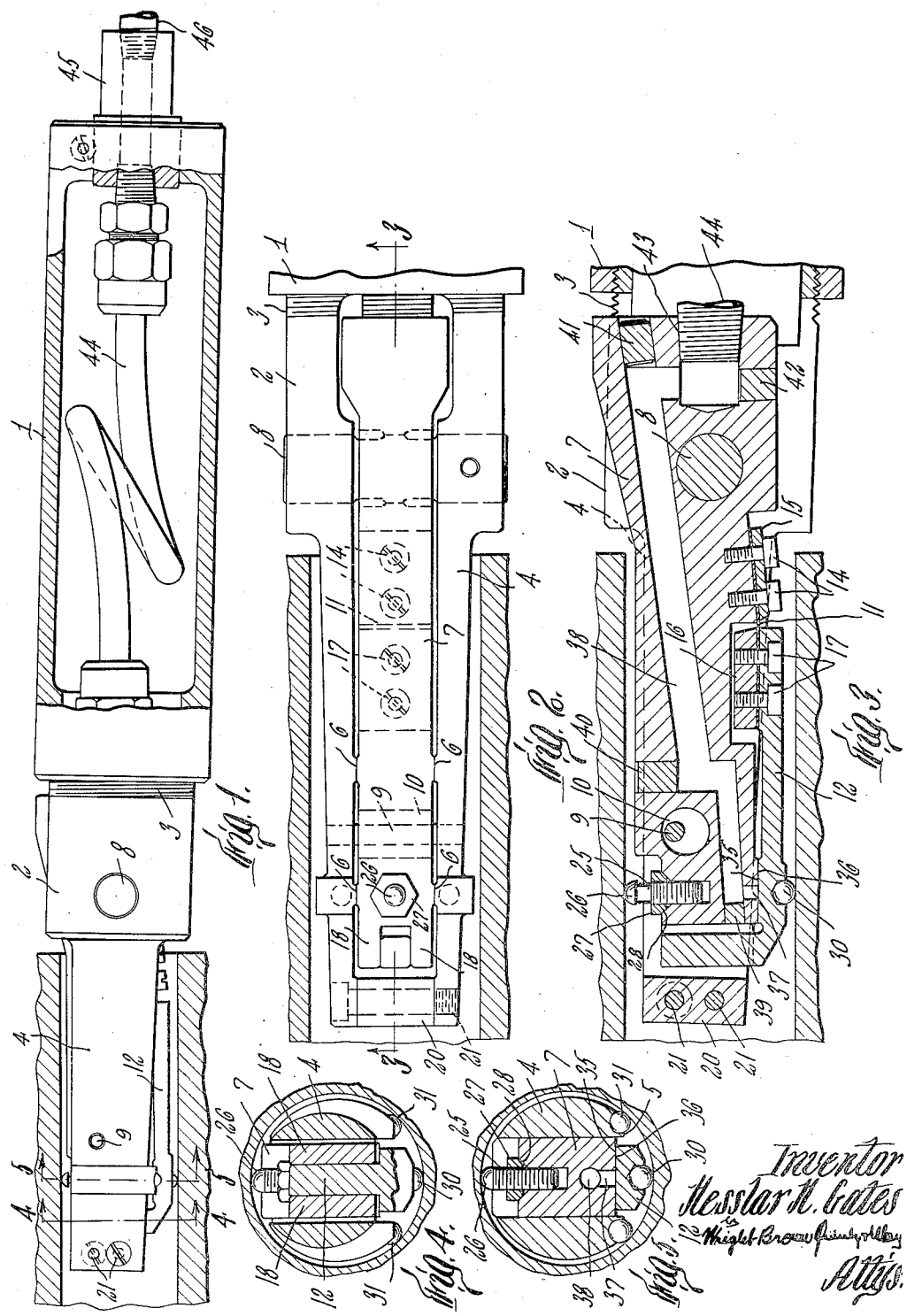

March 25, 1952        H. H. GATES        2,590,170
PORTABLE AIR GAUGE
Filed June 14, 1947        2 SHEETS—SHEET 2
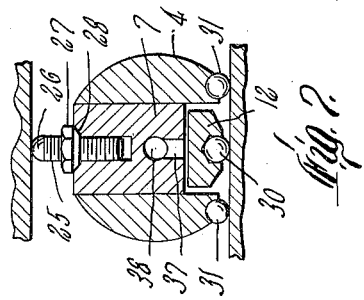
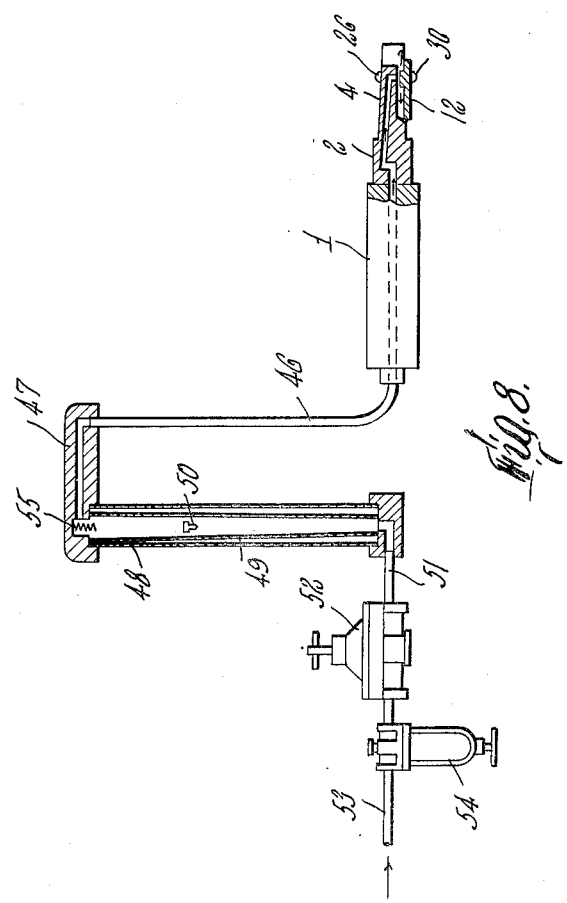
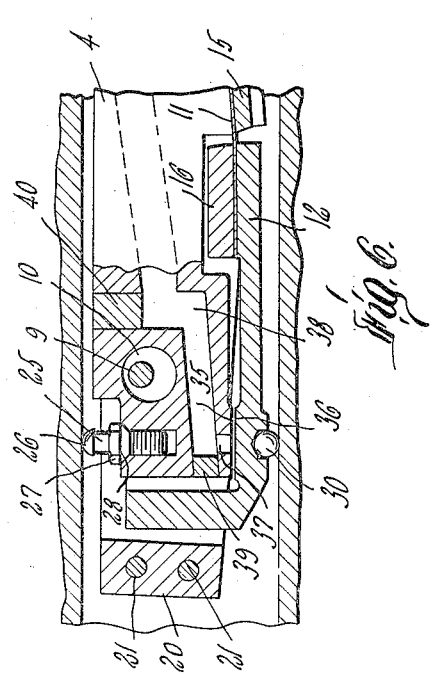
Inventor
Hesslar H. Gates
by Wright Brown Quinby & May
Attys.

Patented Mar. 25, 1952

2,590,170

UNITED STATES PATENT OFFICE 2,590,170

PORTABLE AIR GAUGE

Hesslar H. Gates, Charlestown, N. H., assignor to Bryant Chucking Grinder Company, Springfield, Vt., a corporation of Vermont Application June 14, 1947, Serial No. 754,789

5 Claims. (Cl. 33—178)

This invention relates to gages and has for an object to provide a portable internal gage which has the high accuracy characteristic of a gage of the air type, but which employs gaging anvils for contacting with the work piece or pieces.

A further object is to provide such a gage equally well adapted for measuring internal diameters or the space between two parallel plane surfaces.

A further object is to provide such a gage wherein care that the gage axis shall be parallel or coaxial with the work axis is unnecessary to insure accurate size indication.

Another object is to provide a gage wherein the pressure with which the gage is held in the hole or between the surfaces does not affect the measurement.

Further objects and advantages will appear from a description of an embodiment of the invention shown in the accompanying drawings in which Figure 1 is a side elevation of the work-contacting or feeler portion of the gage shown in gaging relation to internal work, the work being shown in section.

Figure 2 is a fragmentary top plan view of the same.

Figure 3 is a longitudinal sectional view on line 3—3 of Figure 2.

Figures 4 and 5 are detail sectional views on lines 4—4 and 5—5, respectively, of Figure 1.

Figure 6 is a view similar to a portion of Figure 3, but showing the parts in slightly different positions.

Figure 7 is a view similar to Figure 5, but showing the gage in position to measure the spacing between a pair of parallel flat surfaces.

Figure 8 is a somewhat diagrammatic view of the entire gage.

The air gage of this invention embodies a special feeler mechanism intended to be employed with a size gage of the air type. This feeler mechanism is shown in detail in Figures 1 to 7. Referring to these figures, it comprises a handle member 1 having a body extension 2 cylindrical in shape at its rear end and having threaded connection at 3 with the handle portion 1. This body 2 has a forward portion 4 adapted to be entered into the hole to be gaged, or between parallel spaced surfaces the distance between which it is desired to measure. The portion 4 is generally circular in cross section, and as shown is somewhat tapered toward its free end. One face of this extension is flattened, as at 5, and transverse to this flat face, the portion 4 is centrally slotted longitudinally perpendicular to the face 5. At the sides of the slot are spaced raised lands 6 which form guiding faces along which may be moved a feeler member 7. This feeler member 7 is pivoted between the sides of the slot, as on the pivot pin 8, and its pivotal motion is limited by a transverse pin 9 secured in the side walls of the member 4 and passing through an enlarged circular opening 10 through the member 4, as best shown in Figures 3 and 6. This member 7 is thus guided for limited pivotal motion through the slot in the member 4 and is held accurately perpendicular to the pivotal axis by its sliding engagement with the raised lands 6.

Attached to one face of the member 7 parallel to the flattened face 5, is a reed pivot 11 which supports a second feeler member 12. The reed 11 is secured to the member 7 as by screws 14 passing through a clamp plate 15 and the reed 11, and threaded into the chamber 7, and this reed is also secured to the member 12 by a similar but threaded clamp plate 16, screws 17, having their heads seated in countersunk recesses in the member 12, passing through the reed 15 and being threaded into the plate 16. The forward end of the member 12 is extended between jaws 18 at the outer end of the portion 7, being slidably guided thereby for motion parallel to that of the member 7. The forward end of the slot in the member 4 is closed by a block 20 secured in position by a pair of screws 21 extending through the block and engaged in the side wall portions of the member 4 at opposite sides of the slot.

The member 7 is provided with a work feeler or anvil which consists of a screw 25 having a spherical head 26, this screw being threaded into the member 7 adjacent to its free end. Its adjusted axial position is fixed as by a lock nut 27 threaded thereon and having a conical inner end 28 engaging in a mating conical surface in the member 7. In diametrical alinement with this screw 25 is a spherical feeler 30 carried by the member 12 and projecting outwardly therefrom. Also substantially in the same plane with the feelers 25 and 30, are two spherical abutments 31 projecting outwardly from the flat face 5 and also radially beyond the outer surface of the member 4. This is shown best in Figures 4, 5 and 7.

The members 7 and 12 are provided with confronting flat faces 35 and 36, which extend across the plane containing the feeler elements 25 and 30 and the abutments 31, and the face 35 has an aperture 37 therein opposite to the face 36 with which there communicates an air passage 38 extending through the member 7. As shown, angularly related outer end portions of this passage 38 are closed off by plugs 39, 40, 41 and 42 from the exterior of the member 7. At the rear end of the member 7 there is provided a threaded connection 43 with a pipe 44 provided with an intermediate flexible coil which allows motion of the member 7 about its pivot 8. At the rear end of the handle 1, this pipe 44 is coupled to an external nipple 45 through which a flexible hose 46 may be attached. This flexible hose, as shown in Figure 8, leads to the discharge head 47 of an air gage indicated generally at 48. This air gage, as shown diagrammatically in Figure 8, may have a vertical transparent tube 49 tapered so that its larger bore is at its upper end and within which there may ride on an ascending air column an indicator bob 50, the position of which is dependent upon pressure differences above and below the bob. The lower end of the tube 49 is connected through a pipe 51 with a pressure reducing and regulating valve 52 which is supplied with compressed air from a suitable source through a pipe 53 and a filter 54. At 55, in Figure 8, there is shown a spring bumper at the upper end of the tube 49 against which the bob 50 may impinge and be supported when the discharge through the pipe 46 is so free that the bob 50 is driven to its upper limit of motion.

As is well known in gages of this type, the rate of discharge of air from the pipe 46 controls the height of the indicator bob 50 within the tube 49 and by the use of suitable graduations on a scale (not shown) adjacent to the tube 49, a very accurate indication is given of the rate of discharge and thereby the spacing between the faces 35 and 36 of the gage feeler mechanism. This gap between the surfaces 35 and 36 is a function of the distance between the outer surfaces at the measuring points as determined by the feelers 26 and 30.

In use the gage feeler mechanism is inserted in the hole and is supported on the two contact points provided by the abutments 31. This places the two feeler elements 26 and 30 so that a line between them intersects the axis of the hole. A slight rocking of the feeler member will then pass the two measuring points across the diameter of the hole, this being indicated on the air gage calibrations adjacent to the tube 49 as a minimum reading of the bob 50, this being the desired measurement.

When the gage is to be used between two flat parallel surfaces, it is inserted between the surfaces as shown in Figure 7, being supported on the two abutment points 31 engaging one of these surfaces. These abutment points are thus in a plane which is at right angles to the surfaces as viewed along the axis of the feeler mechanism. A slight rocking of this mechanism up and down in this plane will bring the contact points 26 and 30 into a plane which is at right angles to the planes of the parallel surfaces to be measured when viewed along the line between the supporting points 31. Thus the two measuring points 26 and 30 will be in a line perpendicular to the two parallel surfaces between which it is desired to measure and this indication on the air gage is the desired measurement.

When the gage is placed in a hole which is to be measured, it is not necessary to have the axis of the feeler mechanism parallel to the axis of the hole as viewed vertically. Even though these two axes are at some angle to each other, the measuring points 26 and 30 are in a line which always passes through the axis of the hole. Also the pressure with which the gage is held in the hole does not affect the measurement as the pressure with which the two measuring points 26 and 30 contact the surface in the hole is not affected thereby, being determined always by the pressure exerted by the reed pivot and this pressure is the same whether the gage is being used in a hole or for measuring the distance between the two parallel flat surfaces.

Figure 6 shows the surfaces 35 and 36 slightly spaced, allowing the escape of air through the orifice 37, while Figure 3 shows these surfaces substantially in contact with each other.

By measuring known diameters, maximum and minimum, and noting the positions of the bob 50, maximum and minimum readings corresponding to the known sizes of the standard holes may be determined, and the distance between these calibrated in accordance with intermediate sizes. Thus the feeler mechanism may be calibrated to give a correct size indication by the position of the bob 50 when the gage is used to measure unknown hole sizes or spacing between parallel faces.

From the foregoing description of an embodiment of this invention, it should be evident to those skilled in the art that various changes and modifications might be made without departing from its spirit or scope.

I claim:

1. A feeler mechanism for an air gage, comprising a pair of members having opposed end portions presenting opposed faces, means spaced from said faces and pivoting said members together thereby to vary the spacing of said faces by relative motion of said members about said pivoting means, elements carried by said members for engagement with the work and when in such engagement determining the spacing of said faces proportional to work size, a handle partly housing said members and to which one of said members is pivoted for limited rocking motion, one of said members having an orifice through its said face opposite to the said face of the other of said members, said one member having a conduit communicating with said orifice for connection to an air gage indicator.

2. A feeler mechanism for an air gage, comprising a pair of members having opposed end portions presenting opposed faces, means spaced from said faces and pivoting said members together thereby to vary the spacing of said faces by relative motion of said members about said pivoting means, elements carried by said members for engagement with the work and when in such engagement determining the spacing of said faces proportional to work size, a handle having forward and rear ends and partly housing said members adjacent to its forward end and to which one of said members is pivoted for limited rocking motion, one of said members having an orifice through its said face opposite to the said face of the other of said members, said one member having a conduit communicating with said orifice for connection to an air gage indicator and extending through the rear end of said handle.

3. A feeler mechanism for an air gage, comprising an elongated body having a longitudinally extending slot centrally therethrough, a member pivoted adjacent to one end within said slot for motion parallel thereto, means for limiting the extent of such pivotal motion, a second member, a reed pivot supporting said second member on said first-mentioned member for pivotal motion parallel to said slot, said members having confronting faces, a work-engaging element carried by each of said members opposite to said faces, said elements being oppositely disposed, a pair of work-engaging elements carried by said body in substantially a plane with said member-carried elements, and equally angularly spaced therefrom, said face of said first-mentioned member having an aperture therethrough, and a conduit communicating with said aperture for connection to an air gage indicator.

4. A feeler mechanism for an air gage, comprising an elonated body of generally circular cross section, having a longitudinally extending slot centrally therethrough, a member having a rear end pivoted adjacent to said rear end within said slot for limited swinging motion parallel thereto, a second member, a reed pivot supporting said second member from said first-mentioned member for pivot motion parallel to said first-mentioned member pivot motion, said members having opposed flat face portions remote from said pivots, a work-engaging elements carried by each of said members and opposite to each other in the central plane of said slot, said body having a flat face portion at said slot in the transverse plane of said elements, spherical work-engaging elements carried by said body in said plane projecting outwardly beyond said flat face portion and beyond the adjacent circular cross section and equally spaced from said member-carried elements, one of said members having an orifice through its flat face, and a conduit communicating with said orifice for connection to the indicator of an air gage.

5. A feeler mechanism for an air gage comprising an elongated body having a longitudinally extending slot centrally therethrough, a member pivoted adjacent to one end within said slot for motion parallel thereto, said body having lands extending into said slot and provided with guiding faces for said pivoted member, means limiting the extent of pivotal motion of said member, a second member, a reed pivot supporting said second member on said first mentioned member for pivotal motion parallel to said slot, a work-engaging element carried by each of said members in a transverse plane, a pair of work-engaging elements carried by said body in substantially the same transverse plane with said member carried elements, said members having confronting face portions, one of said members having an orifice through its said face portion, and a conduit connected with said orifice and extending through said one of said members for connection to the indicator of an air gage.

HESSLAR H. GATES.

REFERENCES CITED

The following references are of record in the file of this patent:

UNITED STATES PATENTS

| Number | Name | Date |
|---|---|---|
| 1,919,546 | Fletcher | July 25, 1933 |
| 1,985,576 | Mennesson | Dec. 25, 1934 |
| 2,019,541 | Masten | Nov. 5, 1935 |
| 2,105,841 | Ott et al. | Jan. 18, 1938 |
| 2,139,282 | Poock et al. | Dec. 6, 1938 |
| 2,190,306 | Balsiger | Feb. 13, 1940 |
| 2,254,259 | Aller | Sept. 2, 1941 |
| 2,358,769 | Aller | Sept. 19, 1944 |
| 2,392,016 | Wattebot | Jan. 1, 1946 |
| 2,397,494 | Kuppersmith | Apr. 2, 1946 |
| 2,412,413 | Moss | Dec. 10, 1946 |
| 2,431,087 | Subber | Nov. 18, 1947 |
| 2,439,595 | Cooke | Apr. 13, 1948 |
| 2,501,965 | Rupley | Mar. 28, 1950 |

OTHER REFERENCES

American Machinist, page 157, June 7, 1945.